UNITED STATES PATENT OFFICE.

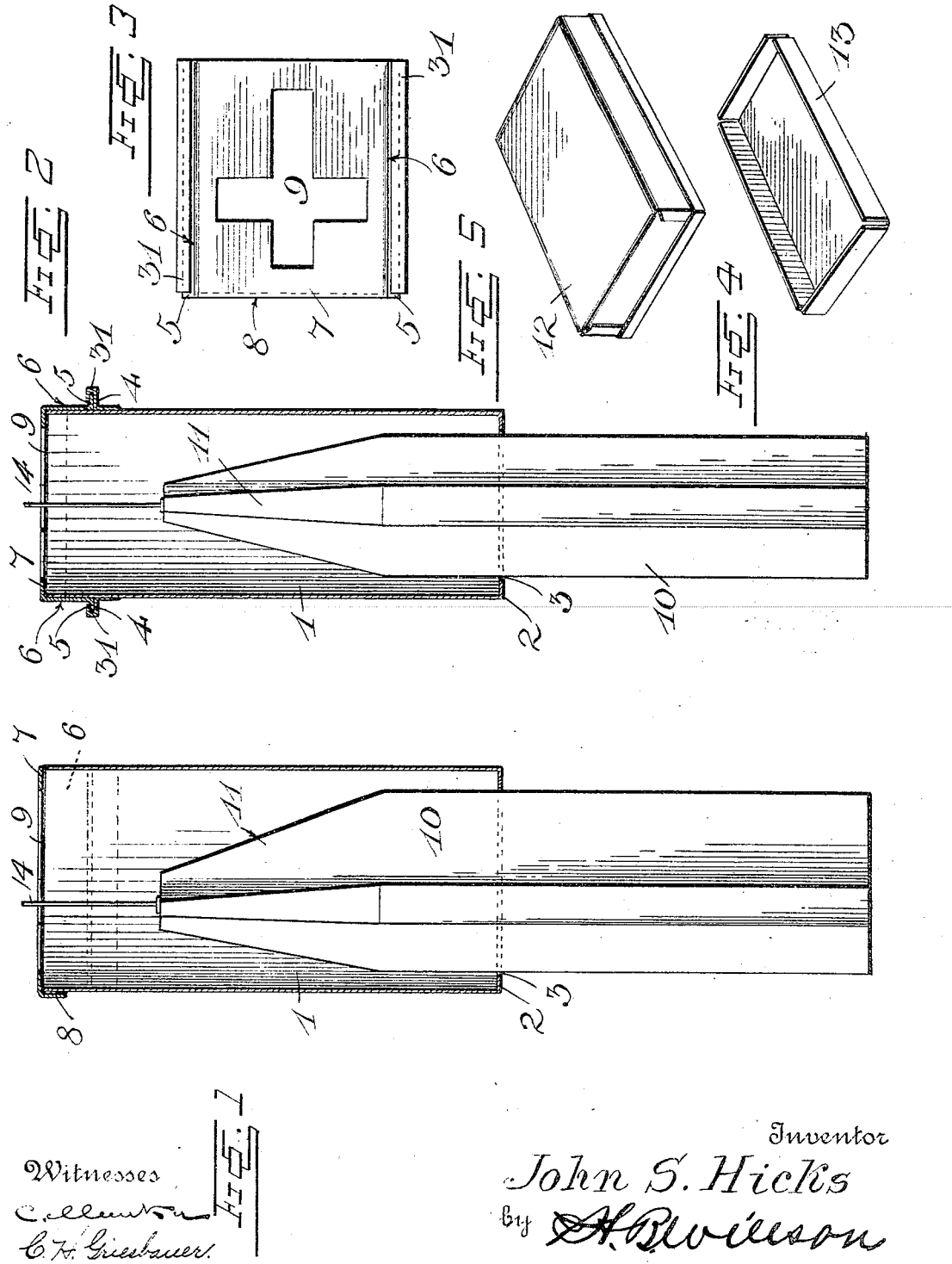

JOHN S. HICKS, OF ERIE, PENNSYLVANIA.

ICE-CREAM MOLD.

No. 801,379. Specification of Letters Patent. Patented Oct. 10, 1905.

Application filed June 29, 1905. Serial No. 267,626.

*To all whom it may concern:*

Be it known that I, JOHN S. HICKS, a citizen of the United States, residing at Erie, in the county of Erie and State of Pennsylvania, have invented certain new and useful Improvements in Ice-Cream Molds; and I do declare the following to be a full, clear, and exact description of the invention, such as will enable others skilled in the art to which it appertains to make and use the same.

My invention is an improved ice-cream mold for molding a brick of ice-cream with a figure of any desired form in the center thereof; and it consists in the construction, combination, and arrangement of devices hereinafter described and claimed.

In the accompanying drawings, Figure 1 is a vertical sectional view of an ice-cream mold embodying my improvements, showing the plunger in the same. Fig. 2 is a similar view taken on a plane at right angles to that of Fig. 1. Fig. 3 is a top plan view of the same. Fig. 4 is a detail view of the bottom for the mold. Fig. 5 is a similar view showing the top for the mold.

In accordance with my invention I provide a mold body or vessel 1, which may be of any suitable form and size and is shown as of oblong rectangular form. The bottom 2 of the mold vessel is provided with an opening 3, which corresponds in shape with the cross-sectional shape of the plunger which is used in connection with the mold vessel. The latter is provided on two opposite sides at a suitable distance from its upper end with guide-flanges 31, having guide-grooves 4 to receive the outwardly-projecting locking-flanges 5, which extend from the sides 6 of the cover 7 of the mold vessel, the said cover being slidable on the upper end of the mold vessel, so that it may be readily attached thereto or detached therefrom. Said cover has at one end a transverse flange 8 to bear against one side of the mold vessel to lock said cover in place thereon. Said cover has an opening 9, which corresponds in size and shape with that in the bottom of the mold vessel.

The plunger 10 is somewhat longer than the mold vessel, and it may be of any suitable design or shape cross-sectionally and must correspond in size and shape with the openings in the cover and bottom of the mold vessel, so that the said plunger may be passed therethrough. The lower end of the plunger is wedge-shaped or tapered, as at 11, to facilitate the passage of the plunger through the ice-cream in the mold and to facilitate the introduction of the lower end of the plunger into the designed opening in the bottom of the mold vessel. A wire 14 is attached to the wedge-nut of the plunger and may be employed to draw the plunger through the mold, as will be understood. An upper cap 12 is provided for the upper end of the mold vessel when the plunger has been withdrawn therefrom, and a lower cap 13 is provided for the lower end of the mold vessel under the same condition.

In the operation of my invention before the plunger is used the lower cap is placed on the lower end of the mold vessel and the upper cap and cover 7 are removed from the mold vessel. The mold is then filled about four-fifths full of moderately-hard ice-cream of a certain color. The cover 7 is then placed on the mold vessel. The bottom cap is removed from the mold vessel. The plunger is then pushed through the mold vessel from the bottom, wire end up, so as to form a hollow space through the ice-cream in the mold of a size and shape corresponding to that of the plunger. This space is then filled with a soft ice-cream of another color. The caps are then placed on the ends of the mold vessel, and the latter is packed in ice for a suitable length of time to harden the cream.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. An ice-cream mold of the class described, comprising a mold vessel having a bottom provided with a mold-opening of suitable design, a cap slidably connected to the upper end of the mold vessel and having a mold-opening of a design corresponding to that in the bottom, and a plunger adapted to be passed through the mold vessel and the openings in the bottom and cover thereof, said plunger corresponding in size and shape cross-sectionally with the design-opening in the bottom and cover of the mold vessel, substantially as described.

2. An ice-cream mold of the class described, comprising a mold vessel having a bottom provided with a mold-opening of suitable design, a cap slidably connected to the upper end of the mold vessel and having a mold-opening of a design corresponding to that in the bottom, and a plunger adapted to be passed through the mold vessel and the openings in the bottom and cover thereof, said plunger corresponding in size and shape cross-sectionally with the design-opening in the bottom and cover of the mold vessel, and caps for the upper and lower end of the mold vessel when the plunger has been removed therefrom, substantially as described.

In testimony whereof I have hereunto set my hand in presence of two subscribing witnesses.

JOHN S. HICKS.

Witnesses:
W. A. CHILDS,
F. C. PIPER.